US012709467B2

(12) United States Patent
Ganz et al.

(10) Patent No.: US 12,709,467 B2
(45) Date of Patent: Aug. 18, 2026

(54) TRASH CAN AUTOMATIC LID STABILIZER

(71) Applicants: Christopher R H Ganz, Glassboro, NJ (US); Steven Spinelli, Glassboro, NJ (US)

(72) Inventors: Christopher R H Ganz, Glassboro, NJ (US); Steven Spinelli, Glassboro, NJ (US)

( * ) Notice: Subject to any disclaimer, the term of this patent is extended or adjusted under 35 U.S.C. 154(b) by 0 days.

(21) Appl. No.: 18/827,942

(22) Filed: Sep. 9, 2024

(65) Prior Publication Data

US 2025/0002247 A1 Jan. 2, 2025

Related U.S. Application Data

(63) Continuation-in-part of application No. 17/873,403, filed on Jul. 26, 2022, now Pat. No. 12,084,272.

(60) Provisional application No. 63/226,436, filed on Jul. 28, 2021.

(51) Int. Cl.
*B65F 1/16* (2006.01)

(52) U.S. Cl.
CPC .... *B65F 1/1615* (2013.01); *B65F 2001/1653* (2013.01); *B65F 2210/148* (2013.01)

(58) Field of Classification Search
CPC ............ B65F 1/1615; B65F 2001/1653; B65F 2210/148
USPC .......................................................... 220/315
See application file for complete search history.

(56) References Cited

U.S. PATENT DOCUMENTS

| | | | | | |
|---|---|---|---|---|---|
| 4,182,530 | A * | 1/1980 | Hodge | E05C 3/048 | 220/228 |
| 5,118,000 | A * | 6/1992 | Howell | B65F 1/122 | 414/407 |
| 5,599,050 | A * | 2/1997 | Tinsley | B65F 1/1615 | 292/210 |
| 6,808,080 | B2 * | 10/2004 | Spiers | B65F 1/1615 | 220/908 |
| 7,806,287 | B2 * | 10/2010 | Rouns | E05B 65/006 | 220/326 |
| 8,206,058 | B2 | 6/2012 | Vrondran et al. | | |
| 9,376,255 | B2 | 6/2016 | Banik et al. | | |
| 9,580,244 | B2 | 2/2017 | Reeb et al. | | |
| 9,821,957 | B1 | 11/2017 | Hurst | | |
| 9,963,276 | B1 | 5/2018 | Arthurs et al. | | |
| 10,618,730 | B2 | 4/2020 | Manssourian | | |
| 11,524,843 | B2 * | 12/2022 | Rothfarb | B65F 1/1615 | |

(Continued)

*Primary Examiner* — Orlando E Aviles
*Assistant Examiner* — Niki M Eloshway
(74) *Attorney, Agent, or Firm* — Boudwin Intellectual Property Law, LLC

(57) ABSTRACT

An automatic trash can lid stabilizer that includes a base that is securable to the perimeter sidewall of a trash can. The automatic trash can lid stabilizer includes a bracket having a first elongated planar piece, a securing fastener, and a second elongated planar piece. The securing fastener includes an animal latch inserted into a hole disposed on the lid grasping device. The animal latch is rotated a quarter turn and locks in place, securing the trash can lid to the trash can. The animal latch is angled at 90 degrees and has a protective covering disposed on a distal end of the animal latch for protection against contact injuries. The automatic trash can lid stabilizer also includes a first rotating flap and a second rotating flap forming a first elongated planar piece and a second elongated planar piece.

23 Claims, 16 Drawing Sheets

(56) References Cited

U.S. PATENT DOCUMENTS

| | | | | |
|---|---|---|---|---|
| 2006/0016816 | A1* | 1/2006 | Bremer | B65F 1/1615 292/259 R |
| 2009/0050627 | A1 | 2/2009 | Shinault | |
| 2016/0068333 | A1 | 3/2016 | Yedikian | |
| 2016/0159570 | A1 | 6/2016 | Reeb et al. | |
| 2016/0257491 | A1 | 9/2016 | Manssourian | |
| 2017/0081119 | A1 | 3/2017 | Blazer et al. | |
| 2017/0297817 | A1 | 10/2017 | Reeb | |
| 2020/0079586 | A1 | 3/2020 | Asmis et al. | |
| 2020/0115156 | A1 | 4/2020 | Hodge | |
| 2021/0339948 | A1 | 11/2021 | McCloughen | |
| 2022/0017301 | A1* | 1/2022 | Chapman | B65F 1/1615 |
| 2022/0315327 | A1 | 10/2022 | Muis et al. | |
| 2023/0249906 | A1 | 8/2023 | Hardman | |

* cited by examiner

TRASH CAN AUTOMATIC LID STABILIZER

CROSS-REFERENCE TO RELATED APPLICATIONS

This U.S. Continuation-In-Part Patent application claims the benefit of U.S. Non-Provisional patent application Ser. No. 17/873,403, filed on Jul. 26, 2022, which claims the benefit of U.S. Provisional Patent Application Ser. No. 63/226,436, filed on Jul. 28, 2021. The above identified patent applications are herein incorporated by reference in their entirety to provide continuity of disclosure.

BACKGROUND OF THE INVENTION

The present invention relates to an accessory device for a trash can. More particularly, the present invention provides an automatic trash can lid stabilizer for a trash can that maintains the lid in a closed position, yet automatically releases and resets when the trash can is turned over to be emptied and returned to an upright position.

Many municipalities and other areas have developed standardized garbage collection operations that include specialized disposal vehicles. These operations typically utilize a common type of trash can that is adapted to be grasped by a pair of lifting arms on the specialized disposal vehicle. The specialized disposal vehicle lifting arms lift the trash can and rotate it simultaneously to dump its contents into the waste storage area of the specialized disposal vehicle before placing the trash can back down on the ground in its original upright orientation. These types of trash cans typically include a pivotally affixed lid that opens automatically as the disposal vehicle dumps the contents of the trash can. Because the lid must open automatically as the trash can is dumped, the lid typically does not have any kind of closure latch or other lid securing mechanism. When the trash can is returned to an upright orientation, the lid sometimes returns to a closed position under its own weight, but no fastener is included for maintaining that closed position over time.

While necessary for the operation of the disposal vehicle, having a lid that cannot be secured closed presents additional problems. For example, the lid does not always return to a closed position when placed upright. Even when in a closed position, wind often causes the trash can lid to blow open and act like a sail. The lid catches the wind and causes the trash can to blow down the street where it must be located and retrieved. The lid being open also allows unwanted odors to escape from the interior of the trash can, and further allows unwanted insects or larger animals to access the contents of the trash can.

In order to solve these problems, some individuals use rocks or other heavy objects to weigh down the lid. However, these are cumbersome and may cause injury if they fall from the lid. They also may cause damage to the overall structure of the trash can and prevent the disposal vehicle from properly dumping the trash can.

In view of the above concerns, it is desirable to provide an accessory device that may be secured to a trash can which allows the trash can's hinged lid to open as normal when the trash can is dumped by the disposal vehicle, yet functions as a closure fastener to maintain the lid in a closed position when the trash can is returned to the ground in its original upright orientation.

Some automatic trash can lid stabilizer devices in the known art exist that are designed to attach to trash cans in an attempt to secure the trash can lid in a closed position. However, the automatic trash can lid stabilizer devices in the known art have several disadvantages and drawbacks, and do not adequately address the issue of keeping the trash can lid closed due to blowing wind or similar weather conditions without causing additional problems. For example, most automatic trash can lid stabilizer devices in the known art lack the ability for the lid to swing open automatically when the trash can is dumped, and then automatically return to the closed position when placed upright again. The automatic trash can lid stabilizer devices in the known art typically include complicated fastener arrangements that are prone to failure and that also must be manually engaged or disengaged by an individual.

These automatic trash can lid stabilizer devices require an individual or the disposal vehicle operator to leave the vehicle and open the lid manually. The individual may forget to latch or unlatch the automatic trash can lid stabilizer device which would result in ineffectiveness. Further, if the disposal vehicle operator were required to manually operate the automatic trash can lid stabilizer devices in the known art to open or close the lid, the garbage retrieval process would be made more inconvenient and inefficient. Additionally, a trash can may be blown over by the wind, and such mechanical latches are prone to breaking or failure when the trash can hit the ground. Also, if the latch has not been resecured by an individual, the lid will open and trash will potentially spill, as well as causing the fallen trash can to catch wind more easily and potentially be blown further away.

In light of the automatic trash can lid stabilizer devices disclosed in the known art, it is submitted that the present invention substantially diverges in functional and design elements from the known art and consequently it is clear that there is a need in the art for an improvement to automatic trash can lid stabilizer devices. In this regard the present invention substantially fulfills these needs.

SUMMARY OF THE INVENTION

In view of the foregoing disadvantages inherent in the known types of automatic trash can lid stabilizers now present in the prior art, the present invention provides an automatic trash can lid stabilizer, wherein the same may be utilized for conveniently maintaining the lid in a closed position when the trash can is upright, which automatically disengages to allow the lid of the trash can to open when the trash can is emptied, and automatically reengages to secure the lid in place when the trash can is returned to an upright position.

The present invention relates to an accessory device for a trash can. More particularly, the present invention provides an automatic trash can lid stabilizer for a trash can that maintains the lid in a closed position yet automatically releases and resets when the trash can is turned over to be emptied and returned to an upright position.

The automatic trash can lid stabilizer comprises a hanger having an elongated base strip with a first end and a second end, wherein the first end of the elongated base strip curves downward creating a gap adapted to receive the edge of a trash can while the rounded point is adapted to be inserted into the trash can, wherein the second end includes an elongated slot, a brace having an elongated planar rectangular portion with a flange that has an aperture, wherein the brace is placed upside down with the flange extending downward and between the second end of the elongated base strip and the trash can, a bracket having a first elongated planar piece, a fastener, and a second elongated planar piece, wherein the aperture of the flange and the trash can align with the elongated slot disposed on the hanger, wherein the second elongated planar piece includes a first end and a second end, a magnet disposed on the second end of the second elongated planar piece, a handle extending outwardly from the second end of the second elongated planar piece to facilitate grasping the handle to close and open the trash can lid of the trash can, a knob including a knob threaded stem that removably extends through a threaded aperture disposed on the flange and the elongated slot disposed on the second end of the elongated base strip, and a steel receptor plate having a wedge-shape with an aperture disposed on the centered lower portion of the steel receptor plate, wherein the magnet extends downward towards the trash can lid magnetically and is coupled to the steel receptor plate disposed on top of the trash can lid to secure the trash can lid.

There is also a corresponding trash can and automatic lid stabilizer system, comprising a trash can having a bottom, a perimeter sidewall, an open upper end, and a lid pivotally attached to the perimeter sidewall, an automatic lid stabilizer comprising a hanger having an elongated base strip with a first end and a second end, wherein the first end of the elongated base strip curves downward creating a gap adapted to receive the edge of a trash can while the rounded point is adapted to be inserted into the trash can, wherein the second end includes an elongated slot, a brace having an elongated planar rectangular portion with a flange that has an aperture, wherein the brace is placed upside down with the flange extending downward and between the second end of the elongated base strip and the trash can, a bracket having a first elongated planar piece, a fastener, and a second elongated planar piece, wherein the aperture of the flange and the trash can align with the elongated slot disposed on the hanger, wherein the second elongated planar piece includes a first end and a second end, a magnet disposed on the second end of the second elongated planar piece, a handle extending outwardly from the second end of the second elongated planar piece to facilitate grasping the handle to close and open the trash can lid of the trash can, a knob including a knob threaded stem that removably extends through a threaded aperture disposed on the flange and the elongated slot disposed on the second end of the elongated base strip, and a steel receptor plate having a wedge-shape with an aperture disposed on the centered lower portion of the steel receptor plate, wherein the magnet extends downward towards the trash can lid magnetically and is coupled to the steel receptor plate disposed on top of the trash can lid to secure the trash can lid.

A second embodiment of the automatic trash can lid stabilizer comprises a security bar having an elongated bar, wherein the first elongated bar is adapted to extend across a trash can lid while making direct contact with the trash can lid, and a locking system having an elongated plate, a lid grasping device, and a securing fastener, wherein the elongated plate extends downward from each end of the elongated bar along and past the outer edge of the trash can lid.

There is also a corresponding trash can and automatic lid stabilizer system, comprising a trash can and automatic lid stabilizer system, comprising a trash can having a bottom, a perimeter sidewall, an open upper end, and a lid pivotally attached to the perimeter sidewall, an automatic lid stabilizer having a security bar having an elongated bar, wherein the first elongated bar is adapted to extend across a trash can lid while making direct contact with the trash can lid, and a locking system having an elongated plate, a lid grasping device, and a securing fastener, wherein the elongated plate extends downward from each end of the elongated bars along and past the outer edge of the trash can lid.

One object of the present invention is to provide an automatic trash can lid stabilizer that maintains the trash can lid in a closed position when the trash can is upright, while automatically disengaging to allow the trash can lid to open when the trash can is emptied, and automatically reengaging to secure the lid in place when the trash can is returned to an upright position.

One object of the present invention is to provide an automatic trash can lid stabilizer that will remain coupled to maintain the trash can lid in the closed position even if the trash can accidentally fall over.

One object of the present invention is to provide an automatic trash can lid stabilizer that includes a brace that has a built-up top and front face that will press against a bracket from the automatic trash can lid stabilizer.

One object of the present invention is to provide an automatic trash can lid stabilizer that includes a built-up brace that fills a gap from the bracket of the automatic trash can lid stabilizer.

One object of the present invention is to provide an automatic trash can lid stabilizer that includes a hanger that when tightened will press against the top and front outer faces of the bracket of the automatic trash can lid stabilizer.

One object of the present invention is to provide an automatic trash can lid stabilizer that includes a clearance on the back end of the hangar so that the front side of the hanger may locate freely and correctly.

One object of the present invention is to provide an automatic trash can lid stabilizer that includes a hinging clearance for the bracket position that will allow flexibility for slight misalignments without a stop contact for a pivot with the bracket.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
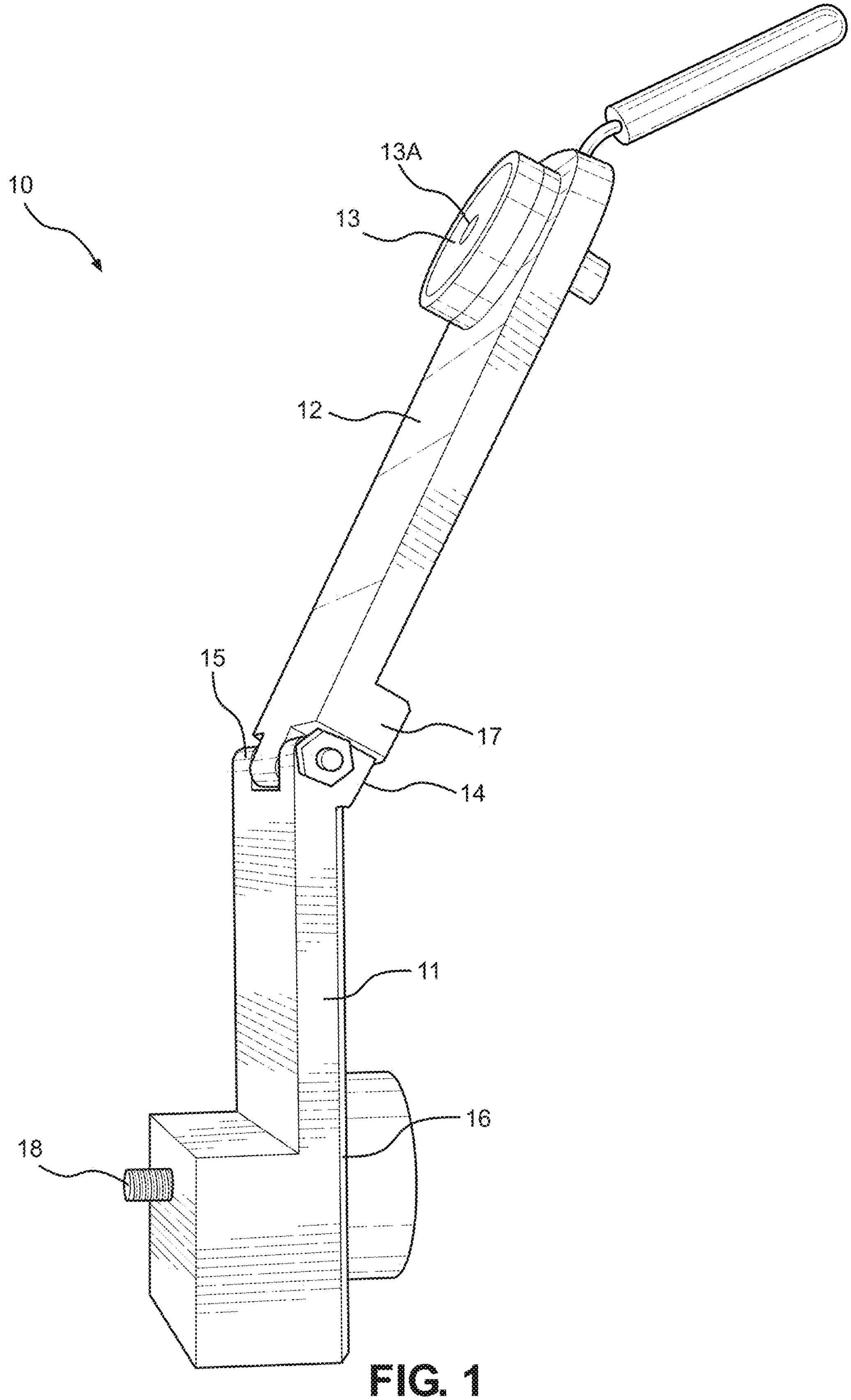
FIG. 1 shows a side perspective view of a first embodiment of an automatic trash can lid stabilizer.

Reference is made herein to the attached drawings. Like reference numerals are used throughout the drawings to depict like or similar elements of an automatic trash can lid stabilizer. For the purposes of presenting a brief and clear description of the present invention, the preferred embodiment will be discussed as used for conveniently maintaining the lid in a closed position when the trash can is upright, while automatically disengaging to allow the lid to open when the trash can is emptied, and automatically reengaging to secure the lid in place when the trash can is returned to an upright position. The figures are intended for representative purposes only and should not be considered to be limiting in any respect.

Referring now to FIG. 1, there is shown a side perspective view of a first embodiment of an automatic trash can lid stabilizer 10.

Figure 3:
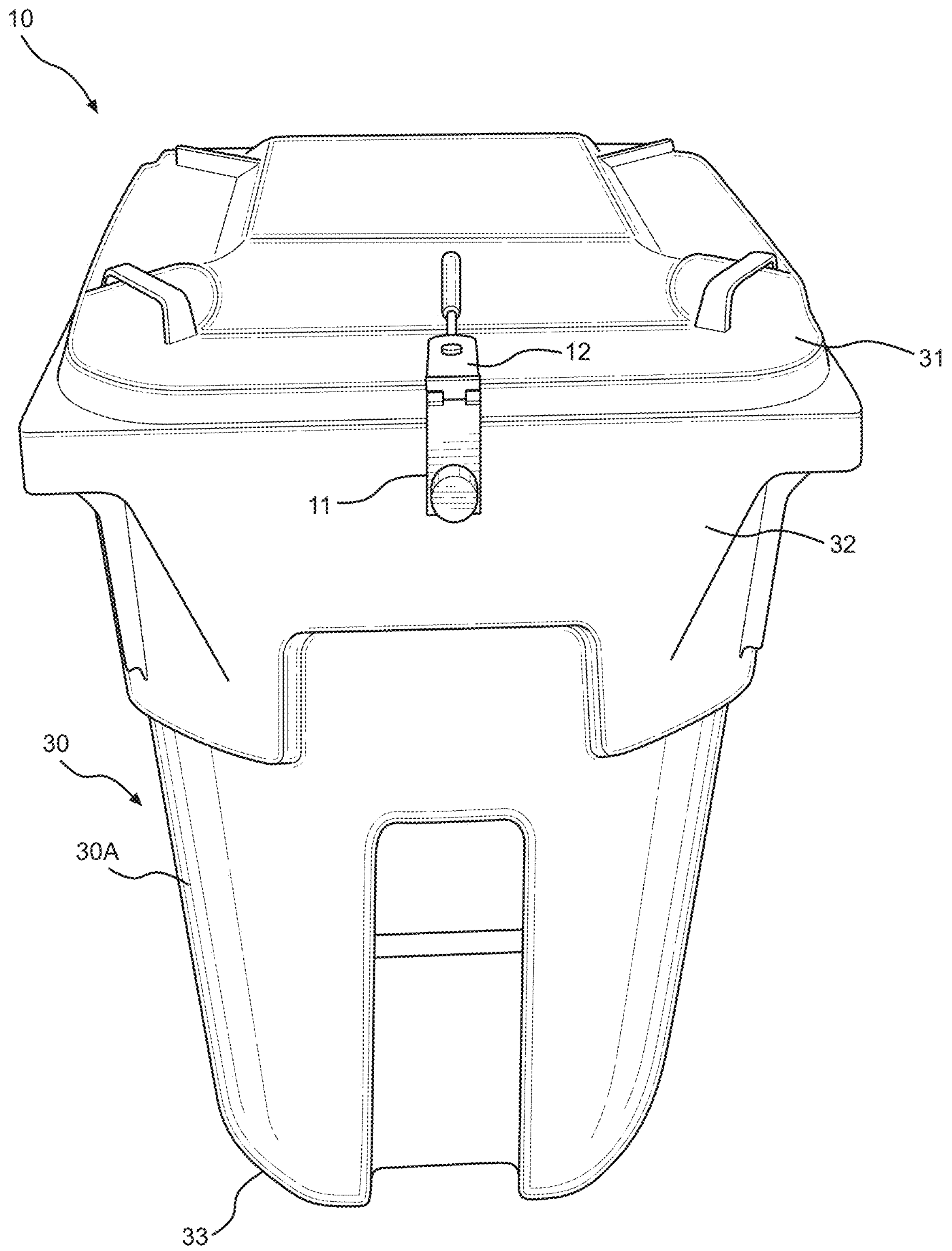
FIG. 3 shows a front environmental perspective view of the first embodiment of the automatic trash can lid stabilizer secured to the trash can with the arm in a lowered position overtop the lid of the trash can.

The automatic trash can lid stabilizer 10 may include a base 11 having a mounting fastener configured to secure the base 11 to a sidewall of a trash can (FIG. 3, 30). In the shown embodiment, the mounting fastener may include a threaded fastener 18, which may be inserted through apertures in the lower end 16 of the base 11, and into corresponding apertures in the trash can (FIG. 3, 30).

In other embodiments, other mounting mechanisms may be utilized. For example, a strong adhesive or the like may be utilized to secure the base 11 to the trash can sidewall (FIG. 3, 30A).

An arm 12 may be pivotally connected to an upper end of the base 11, such that the arm 12 may rotate about a pivot point. In the shown embodiments, the arm 12 may be connected to the base 11 via a hinge pin 15, which may be adjustable. In other embodiments, other pivoting connections may be utilized. A magnetic coupler 13 may be disposed on an upper end of the arm 12, which removably engages a steel receptor plate (FIGS. 2-4, 170). The magnetic coupler 13 may be attached to the arm 12 via an adjustable fastener 13A, or may be integrally formed with the arm 12.

The automatic trash can lid stabilizer 10 may include an angled stop 14 that is configured to limit the rotation movement of the arm 12 as it rotates away from the trash can lid 31 when the trash can 30 is upended and dumped. In the shown embodiment, the angled stop 14 may extend upwardly from the base 11, such that a lower end 17 of the arm 12 contacts the angled stop 14 and is prevented from over-rotating.

In the shown embodiment, the angled stop 14 may prevent the arm 12 from rotating more than approximately 30 degrees with respect to the vertically oriented base 11. This positioning may ensure that the arm 12 will always rotate back overtop a closed trash can lid 31 when the trash can 30 is returned to an upright position after being dumped. The hinge pin 15 may be adjusted to control the rate of movement of the arm 12, ensuring that the trash can lid 31 will close before the arm 12 rotates back overtop the trash can lid 31.

Figure 2:
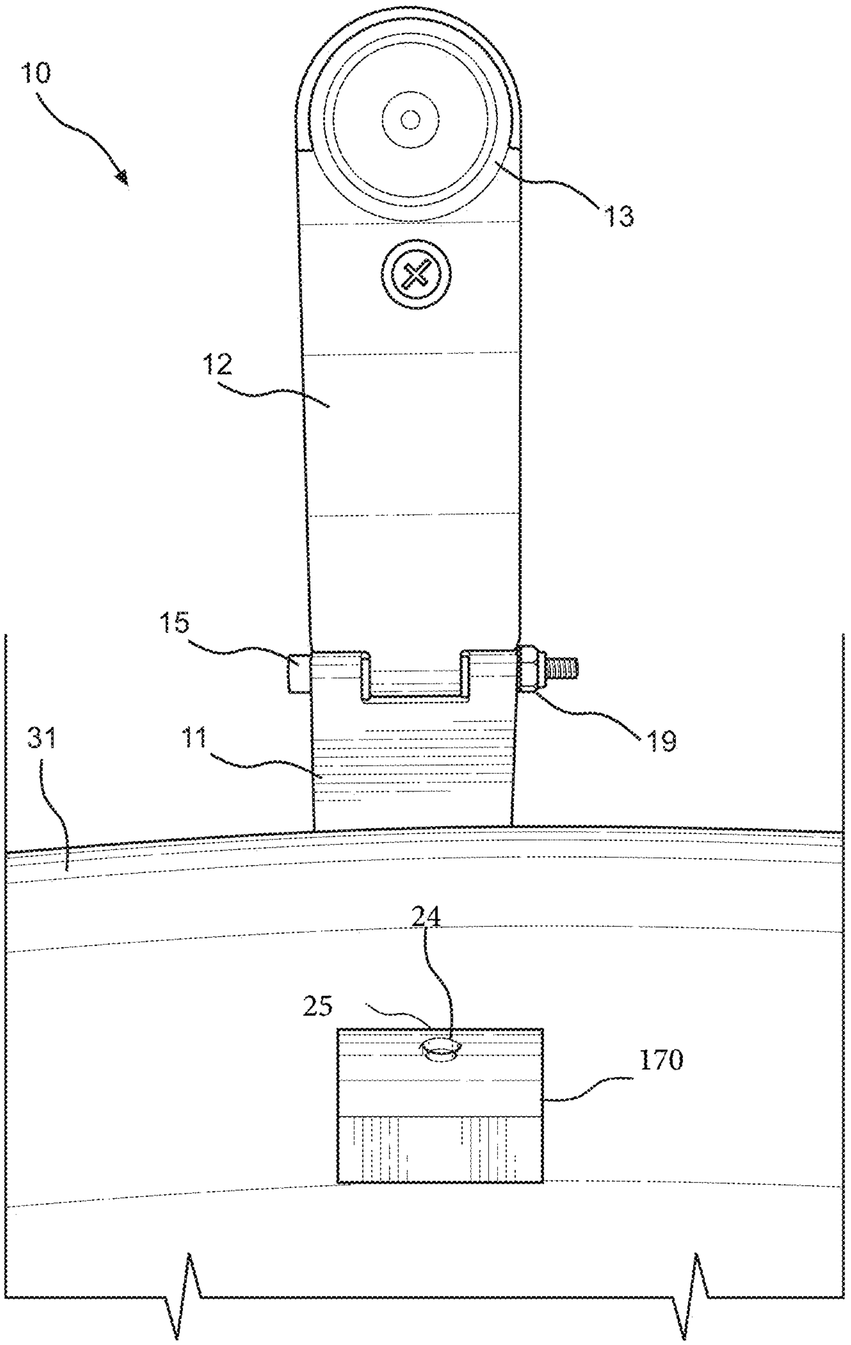
FIG. 2 shows a front perspective view of the first embodiment of the automatic trash can lid stabilizer secured to a trash can with an arm in a raised position away from a lid of the trash can.

Referring now to FIG. 2, there is shown a front perspective view of an embodiment of the automatic trash can lid stabilizer 10 secured to a trash can (FIG. 3, 30) and with the arm 12 in a raised position away from the trash can lid 31.

A steel receptor plate 170 may be configured to secure to an upper surface of a trash can lid 31, such that the magnetic coupler 13 is configured to removably secure to the steel receptor plate 170 via magnetic attraction. In the shown embodiment, the steel receptor plate 170 may include a threaded fastener 24 configured to secure to an upper surface of a trash can lid 31. The threaded fastener 24 may include an aperture 25 in the steel receptor plate 170, an aperture 25 in the trash can lid 31, and a threaded fastener 24 extending therethrough, such that a screw or the like may secure the steel receptor plate 170 to an existing trash can lid 31 via countersunk hole and screw. In other embodiments, the steel receptor plate 170 may be integrally formed within the trash can lid 31 during manufacture of the trash can lid 31.

The arm 12 is shown in a raised position rotated away from the trash can lid 31 of the trash can 30, which occurs automatically when the trash can 30 is turned upside down and emptied of its contents. In the shown embodiment, the hinge pin 15 may include an adjustable fastener 19, which may tighten or loosen the pivoting connection between the base 11 and arm 12. As the adjustable fastener 19 may be tightened, more friction is applied, so the arm 12 will rotate back toward the trash can lid 31 more slowly. As the adjustable fastener 19 may be loosened, less friction is applied, so the arm 12 will rotate back toward the trash can lid 31 more quickly when the trash can 30 is returned to the upright position. The adjustable fastener 19 may thus be adjusted to ensure that the trash can lid 31 returns to the closed position more quickly than the arm 12 rotates back to the closed position when the trash can 30 is turned back to its upright orientation, ensuring that the arm 12 will always rotate overtop the trash can lid 31.

Referring now to FIG. 3, there is shown a front environmental perspective view of the first embodiment of the automatic trash can lid stabilizer 10 that may be secured to a trash can 30 with the arm in a lowered position overtop the trash can lid 31.

The trash can 30 may include at minimum a base 33, a plurality of perimeter sidewalls 32, and a pivotally affixed trash can lid 31, which selectively covers the open upper end of the trash can 30. While the present invention may be utilized with a plurality of the trash cans 30 that are dumped via a lifting arm into a trash vehicle, there is no limit to a type of the trash can 30 to which the present invention may apply, as long as it includes a trash can lid 31 that may be held down in a closed position.

When the trash can lid 31 is closed, the arm 12 may be rotated overtop the trash can lid 31, such that the two magnetic couplers engage and retain the arm 12 and the trash can lid 31 in the closed position. This prevents gusts of wind or other forces from opening the trash can lid 31 when undesired. The magnetic strength of the couplers are selected so that the weight of the trash can lid 31 is enough to uncouple the magnetic couplers when the trash can 30 is turned upside down for dumping, yet so they are strong enough to retain the trash can lid 31 in the closed position when the trash can 30 is upright. Additionally, the magnetic coupler 13 and the steel receptor plate 170 are able to maintain the trash can lid 31 in the closed position even if the trash can 30 accidentally falls over due to wind or other circumstances. This prevents trash from spilling out if the trash can 30 is full, and further prevents the trash can 30 and trash can lid 31 from catching the wind and being blown down the street.

Figure 4:
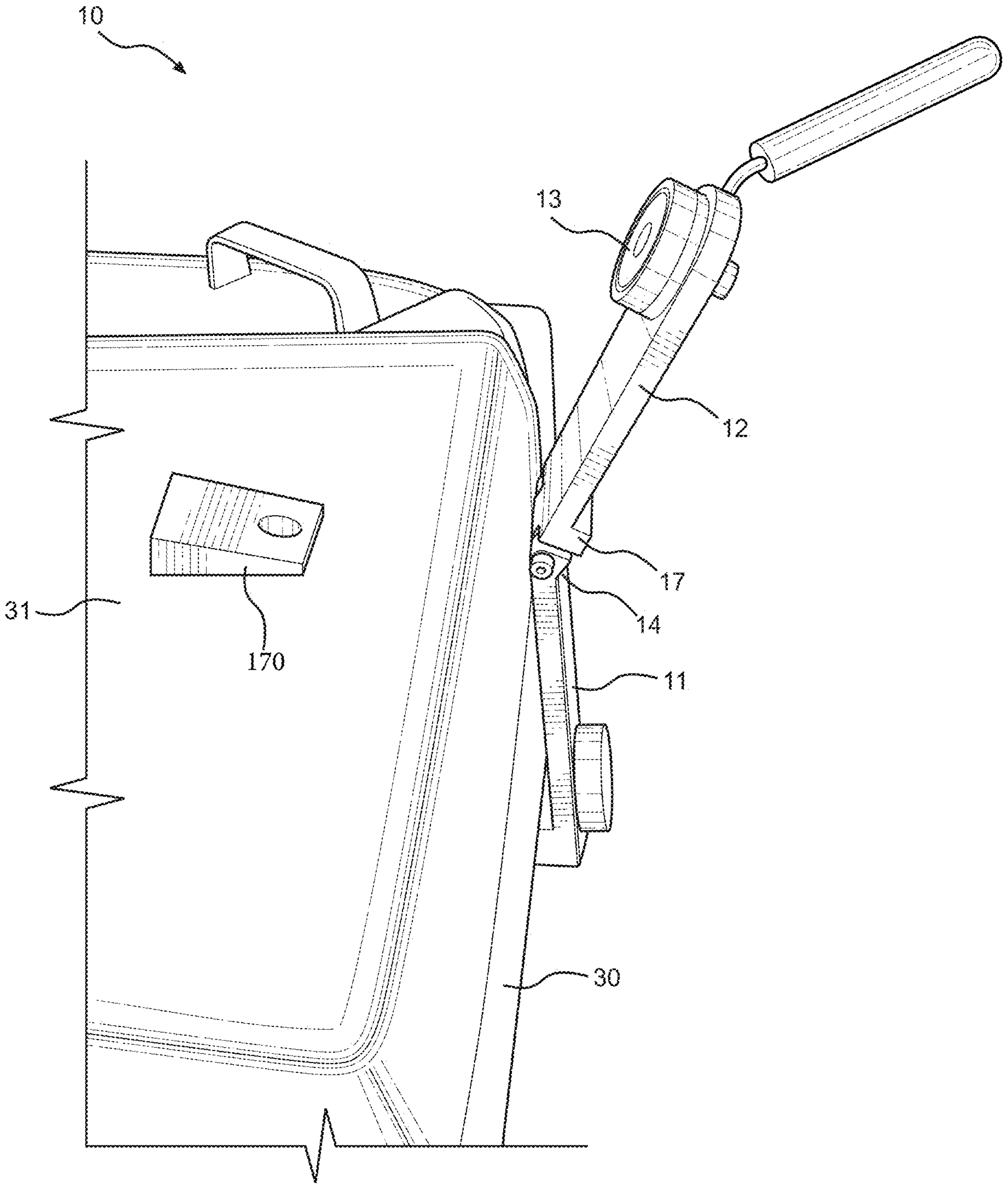
FIG. 4 shows a side environmental perspective view of the first embodiment of the automatic trash can lid stabilizer secured to the trash can with the arm in a raised position away from the lid of the trash can.

Referring now to FIG. 4, there is shown a side environmental perspective view of the first embodiment of the automatic trash can lid stabilizer 10 secured to the trash can 30 with the arm 12 in a raised position away from the trash can lid 31.

In the shown embodiment, the arm 12 further includes a handle 20 affixed thereto. This may allow the arm 12 to be moved by an operator to an open or closed position as needed, so that the trash can lid 31 may be opened without upending the trash can 30. The illustrated trash can 30 may be recently been returned to the upright position, so that the trash can lid 31 closes automatically. Due to the angled stop 14 preventing over rotation of the arm 12 away from the trash can lid 31, the arm 12 will always rotate back overtop the trash can lid 31, no matter the original orientation of the trash can 30. Once rotated back overtop the trash can lid 31, the magnetic coupler 13 of the arm 12 may automatically couple to the steel receptor plate 170 of the trash can lid 31, preventing wind or other forces from opening the trash can lid 31 before the trash can is needed to be dumped again. The handle 20 may allow the user to easily rotate the arm 12 away from the trash can lid 31 when placing garbage, recycling, or the like into the trash can 30. The arm 12 may then be rotated back to the closed position overtop the closed trash can lid 31, allowing the trash can lid 31 to be opened manually as needed to fill the trash can 30 prior to it being overturned and emptied.

Figure 5:
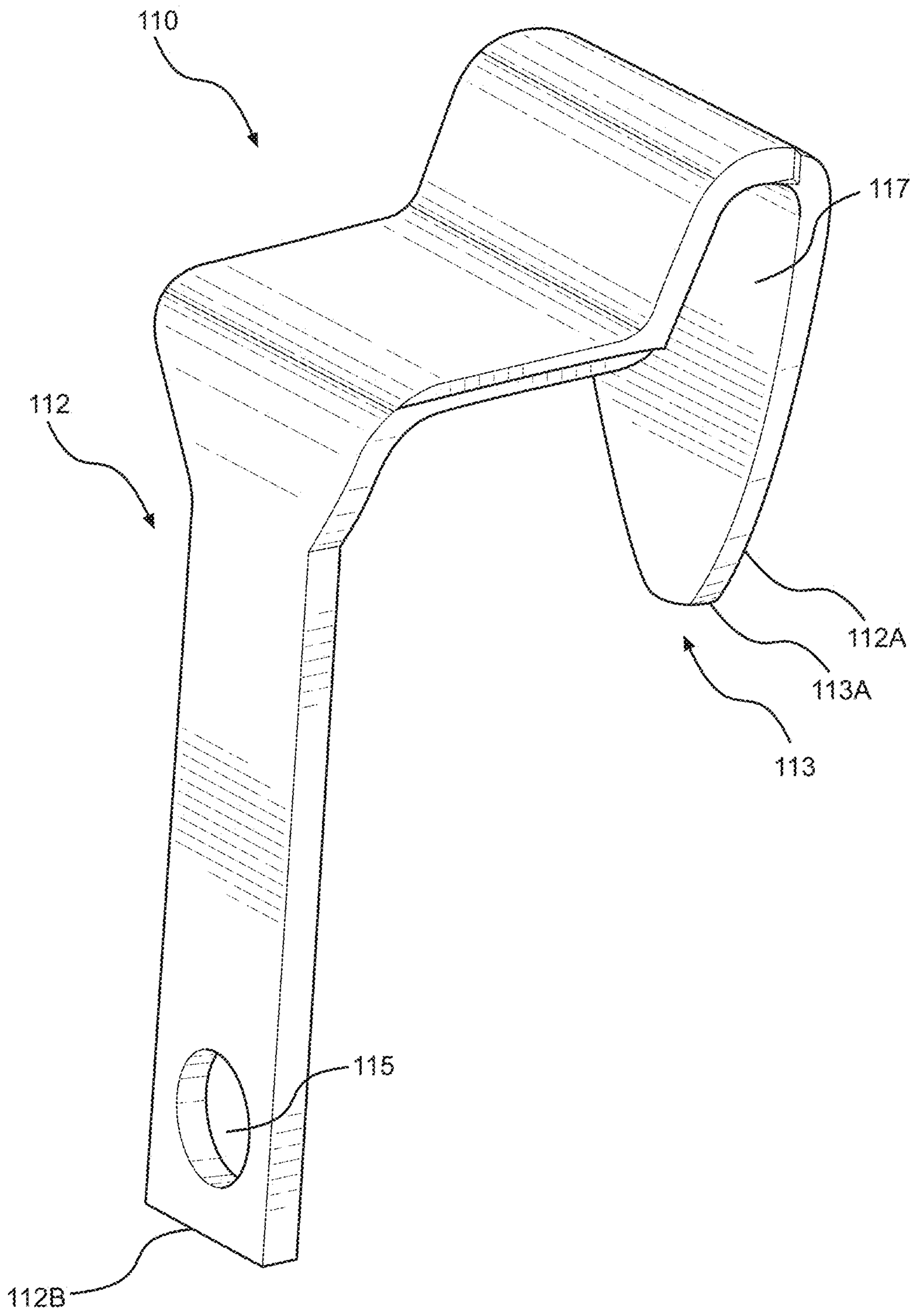
FIG. 5 shows a side perspective view of a hanger of a second embodiment of the automatic trash can lid stabilizer.
Figure 10:
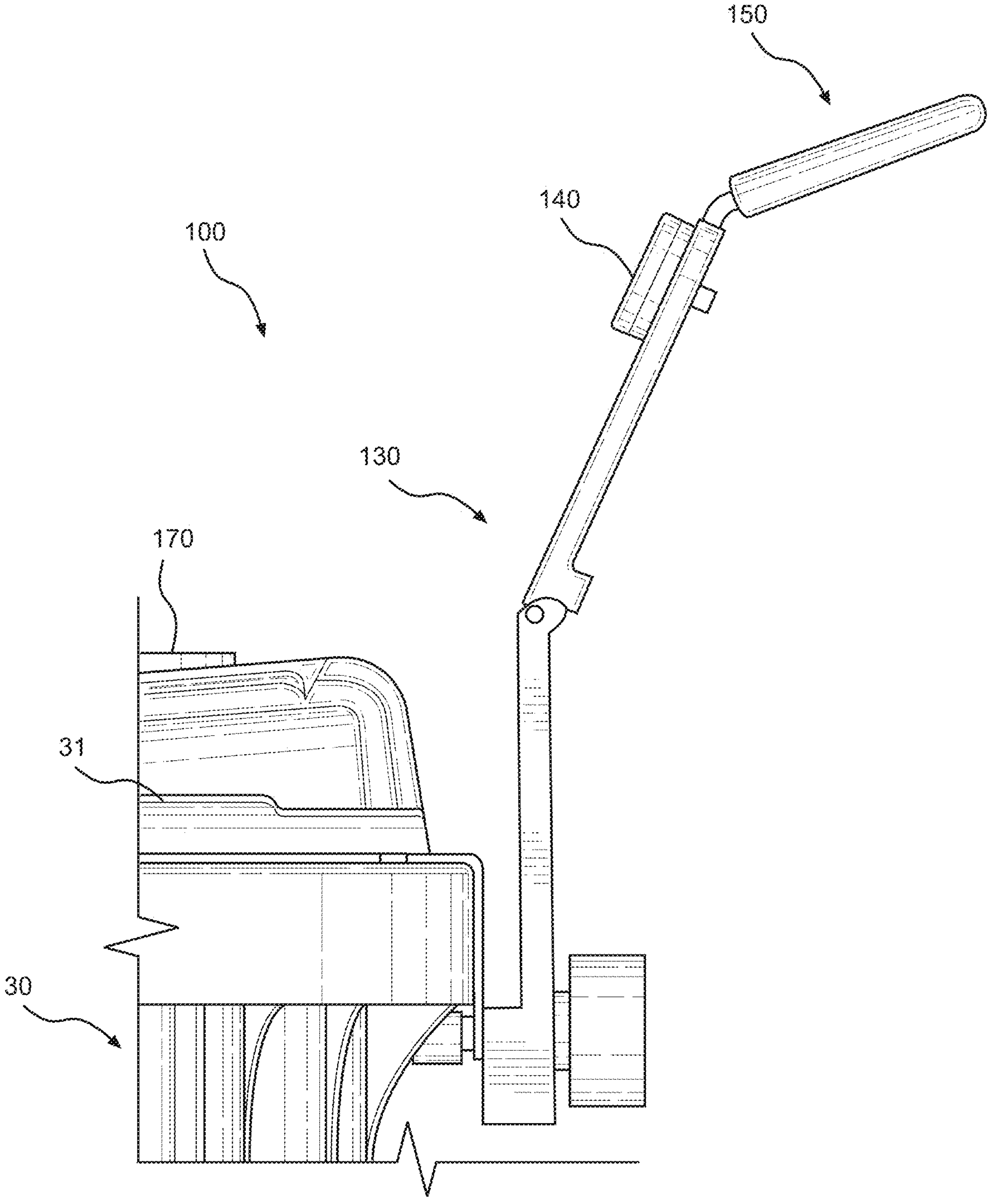
FIG. 10 shows a side environmental perspective view of the second embodiment of the automatic trash can lid stabilizer in an open position.

FIG. 5 shows a side perspective view of an alternate embodiment of a hanger 110 of the automatic trash can lid stabilizer (FIG. 10, 100).

The hanger 110 may include an elongated base strip 112 having a first end 112A and a second end 112B.

The first end 112A of the elongated base strip 112 may have a point 113 and more specifically may be a rounded point 113A or the like. The second end 112B of the elongated base strip 112 may have an elongated slot 115 disposed on the second end 112B of the elongated base strip 112.

The elongated base strip 112 may extend approximately 180 degrees upward from the first end 112A. The elongated base strip 112 may curve downward creating a gap 117 that may be adapted to receive the edge of a trash can 30 while the rounded point 113A is inserted into the trash can 30. The elongated base strip 112 may then extend horizontally and then bend perpendicularly downward towards the second end 112B. The elongated base strip 112 may be made of metal or the like.

Figure 6:
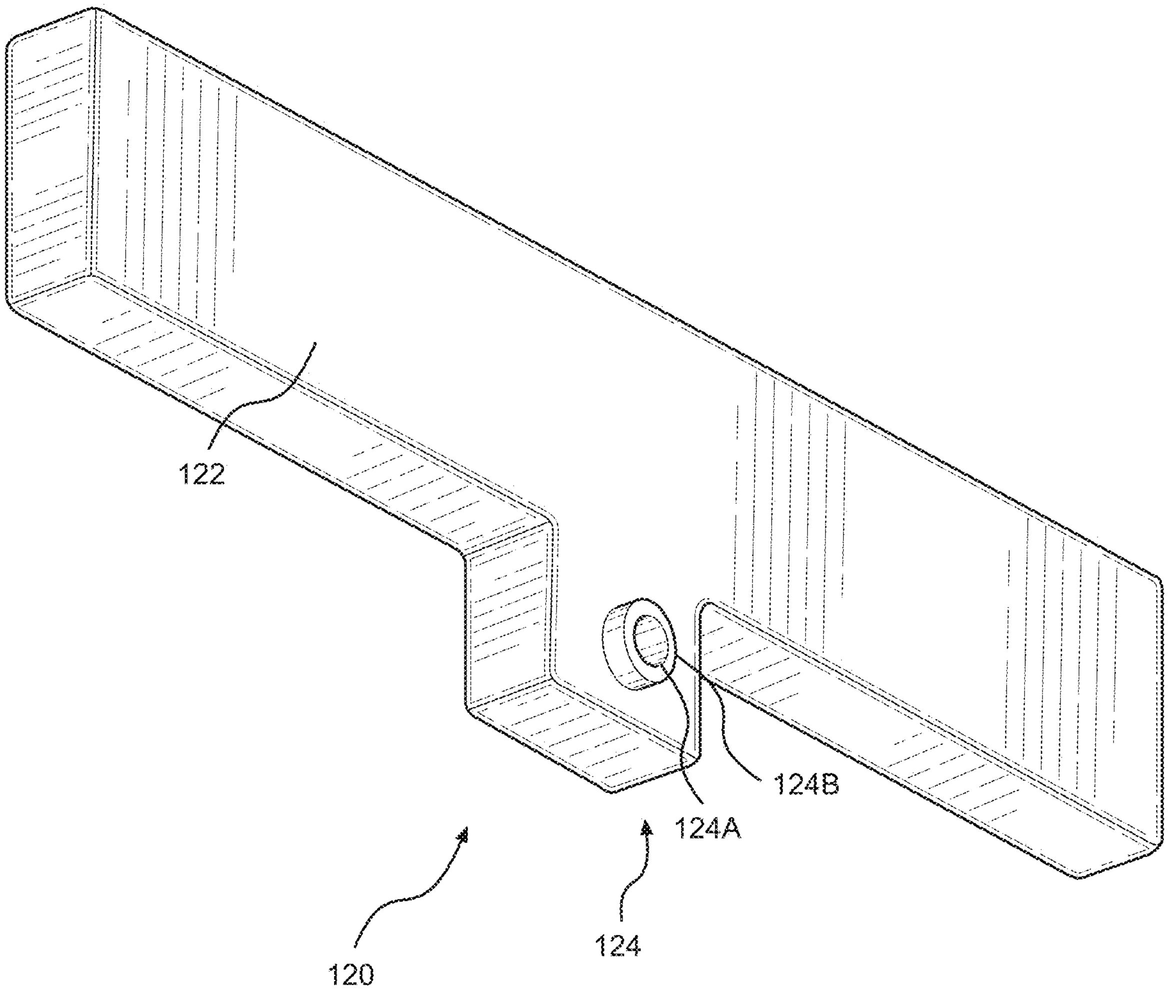
FIG. 6 shows a front perspective view of a brace of the second embodiment of the automatic trash can lid stabilizer.

FIG. 6 shows a front perspective view of an alternate embodiment of a brace 120 of the automatic trash can lid stabilizer (FIG. 10, 100).

The brace 120 may include an elongated planar rectangular portion 122 having a flange 124 that may have an aperture 124A with a plurality of raised outer edges 124B. The brace 120 may be made of metal or the like.

Figure 7:
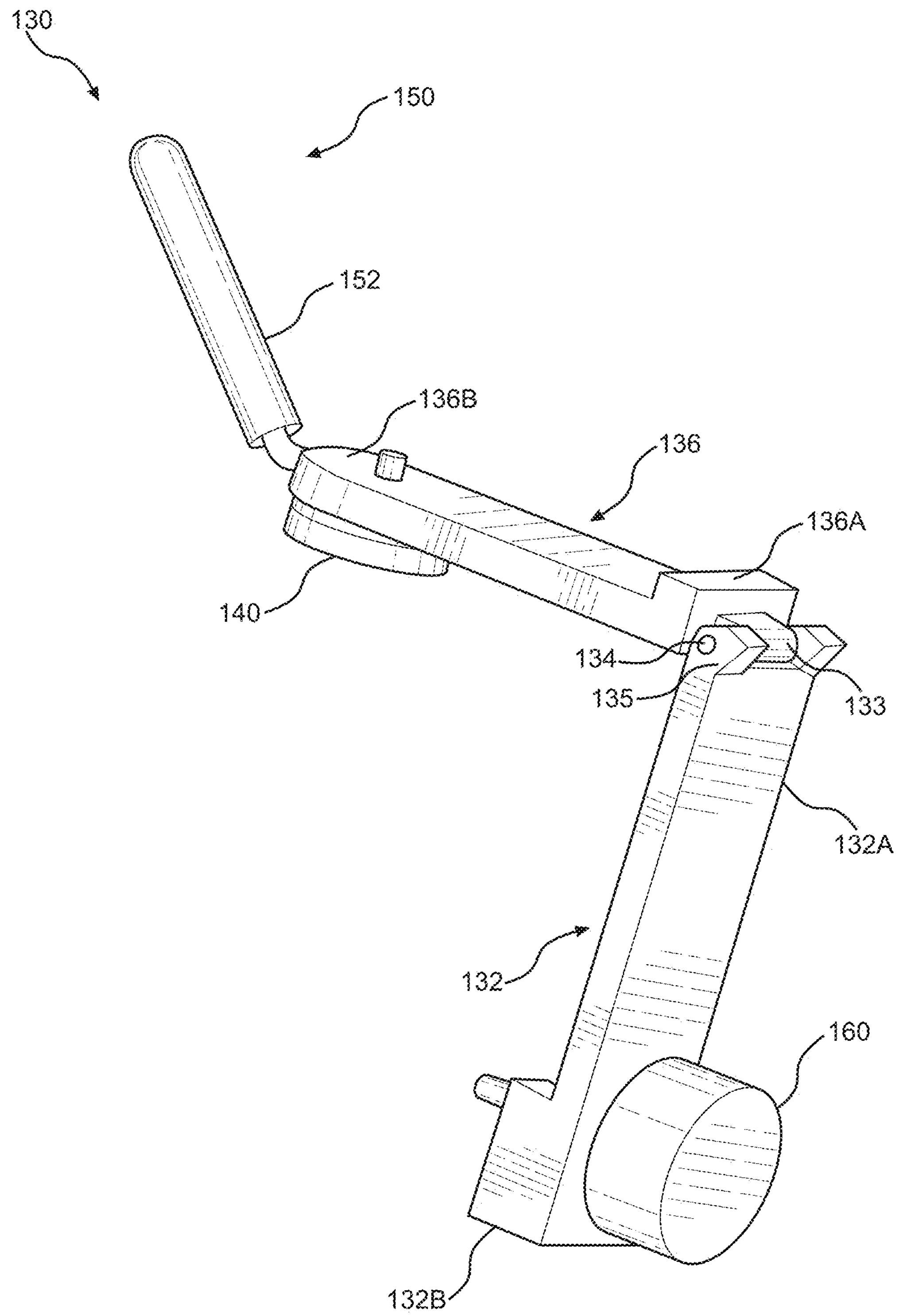
FIG. 7 shows a side perspective view of a bracket of the second embodiment of the automatic trash can lid stabilizer.

FIG. 7 shows a side perspective view of an alternate embodiment of a bracket 130, a magnet 140, a handle 150, and a knob 160 of the automatic trash can lid stabilizer 100.

The bracket 130 may include a first elongated planar piece 132, a fastener 134, and a second elongated planar piece 136.

The first elongated planar piece 132 may include a forked end 132A and a flange 132B protruding from an opposite end and other facing of the forked end 132A of the first elongated planar piece 132. The fastener 134 may be disposed across the forked end 132A of the first elongated planar piece 132. The fastener 134 may be selected from the group consisting of a pin, a bolt, a threaded screw, or the like. The second elongated planar piece 136 may include a first end 136A and a second end 136B. The first end 136A of the second elongated planar piece 136 may be coupled to the first elongated planar piece 132 by the fastener 134. More specifically, the first end 136A of the second elongated planar piece 136 may be coupled to the first elongated planar piece 132 with an elongated horizontal hook 133 that couples to the fastener 134 between the forked end 132A of the first elongated planar piece 132. The second elongated planar piece 136B may include an angled stop 135 for the bracket 130 in an open position. More specifically, the angled stop 135 is a flat-to-flat stop which may wear less and put less strain on the fastener 134.

The magnet 140 may be disposed on the second end 136B of the second elongated planar piece 136.

The handle 150 may extend outwardly from the second end 136B of the second elongated planar piece 136 at an approximate 45° degree angle or the like to facilitate grasping the handle 150 to close or open the trash can lid (FIG. 4, 31) of the trash can (FIG. 4, 30). The handle 150 may also include a plurality of padding 152 to provide comfort to anyone grasping the handle 150.

The knob 160 may include a knob threaded stem 162 that may extend through a threaded aperture 164 disposed on the flange 132B protruding from an opposite end and other facing of the forked end 132A of the first elongated planar piece 132 and the elongated slot 115 disposed on the second end 136B of the elongated base strip 112. The knob 160 may also be removable from the flange 132B and the elongated base strip 112.

Figure 8:
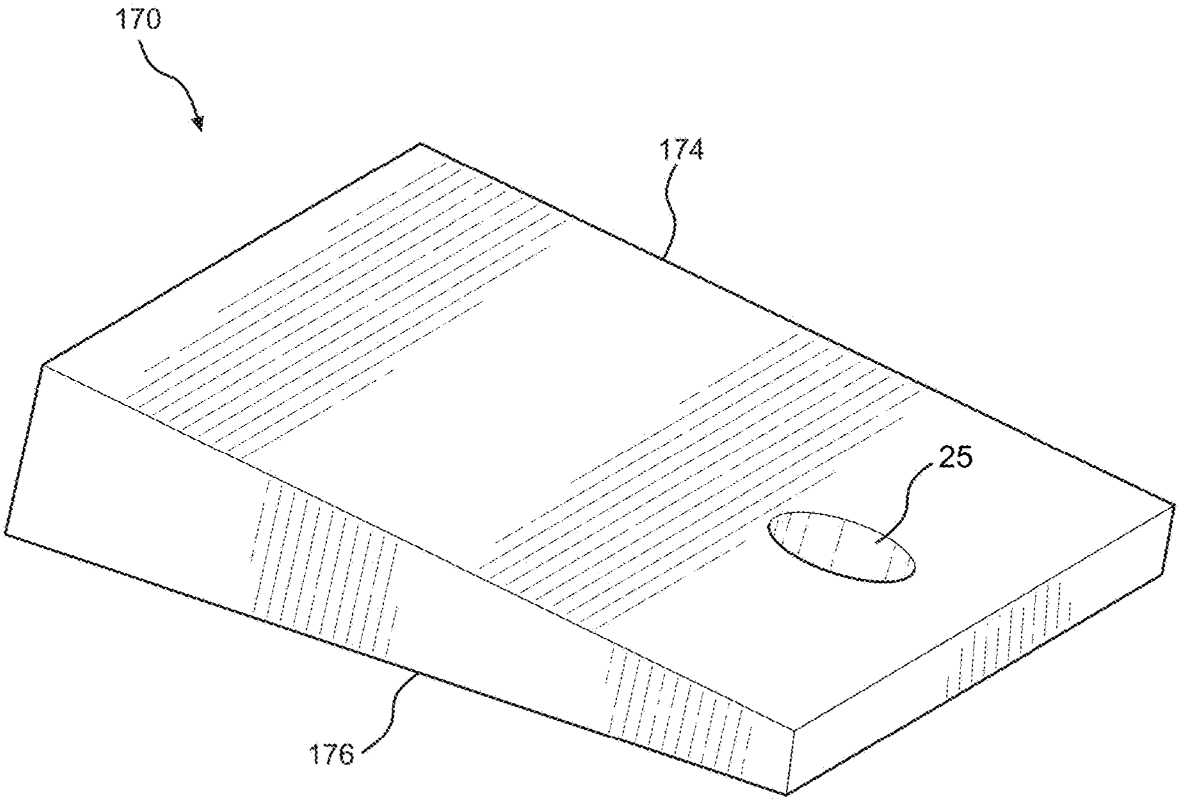
FIG. 8 shows an overhead perspective view of a steel receptor plate of the second embodiment of the automatic trash can lid stabilizer.

FIG. 8 shows an overhead perspective view of an alternate embodiment of a steel receptor plate 170 of the automatic trash can lid stabilizer 100.

The steel receptor plate 170 may have a wedge-shape with an aperture 25 disposed on the centered lower portion of the steel receptor plate 170. The steel receptor plate 170 may have a planar down sloping top surface 174 or the like and a planar flat bottom surface 176 that matches the slope of the trash can lid 30.

The aperture 25 may accommodate a fastener selected from the group consisting of a screw, a bolt, a threaded screw, or the like.

Figure 9:
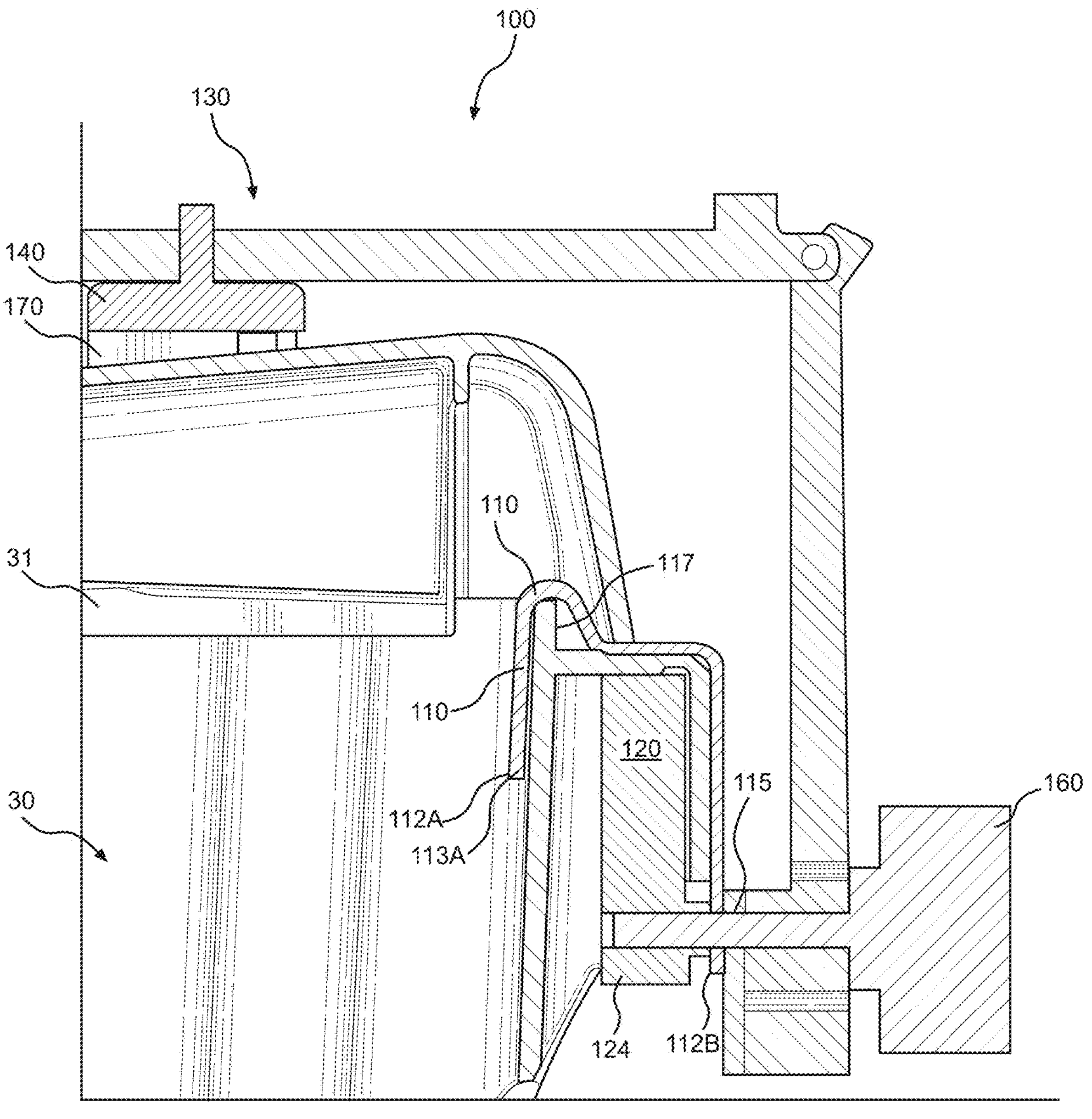
FIG. 9 shows a side environmental perspective view of the second embodiment of the automatic trash can lid stabilizer in a closed position.

FIG. 9 shows a side environmental perspective view of an alternate embodiment of the automatic trash can lid stabilizer 100 in a closed position.

The automatic trash can lid stabilizer 100 may include the hanger 110, the brace 120, the bracket 130, the magnet 140, the handle 150, the knob 160, and the steel receptor plate 170.

The hanger 110 may include the first end 112A of the elongated base strip 112 being inserted over the front edge of the trash can (FIG. 4, 30) into the trash can 30. The front edge of the trash can 30 may sit within the gap 117 of the elongated base strip 112 and may be adapted to receive the edge of a trash can 30 while the rounded point 113A is inserted into the trash can 30. The second end 112B of the elongated base strip 112 may extend over the front edge of the trash can 30 and extends away from the trash can 30.

The brace 120 may be placed upside down with the flange 124 extending downward and between the second end 112B of the elongated base strip 112 and the trash can 30. The flange 124 of the hanger may align with the elongated slot 115.

The bracket 130 may have the magnet 140 extend downward from the lid 30 to magnetically coupled to the steel receptor plate 170 disposed on top of the trash can lid 31.

The magnet 140 may extend downward towards the trash can lid 31 to magnetically coupled to the steel receptor plate 170 disposed on top of the trash can lid 31.

The handle 150 may be grasped and moved to dispose the magnet 140 that may extend downward towards the trash can lid 31 and to remove the magnet 140 disposed on the trash can lid 31.

The knob 160 may be rotated to secure the automatic trash can lid stabilizer 100 to the trash can 30.

The steel receptor plate 170 may be disposed on the trash can lid 31 to form a relatively flat contact surface with the magnet 140 as the higher side of the steel receptor plate 170 is placed downward against the slope of the trash can lid 31.

FIG. 10 shows a side environmental perspective view of an alternate embodiment of the automatic trash can lid stabilizer 100 in an open position.

The handle 150 may be grasped to pull the magnet 140 away from the steel receptor plate 170.

Figure 11:
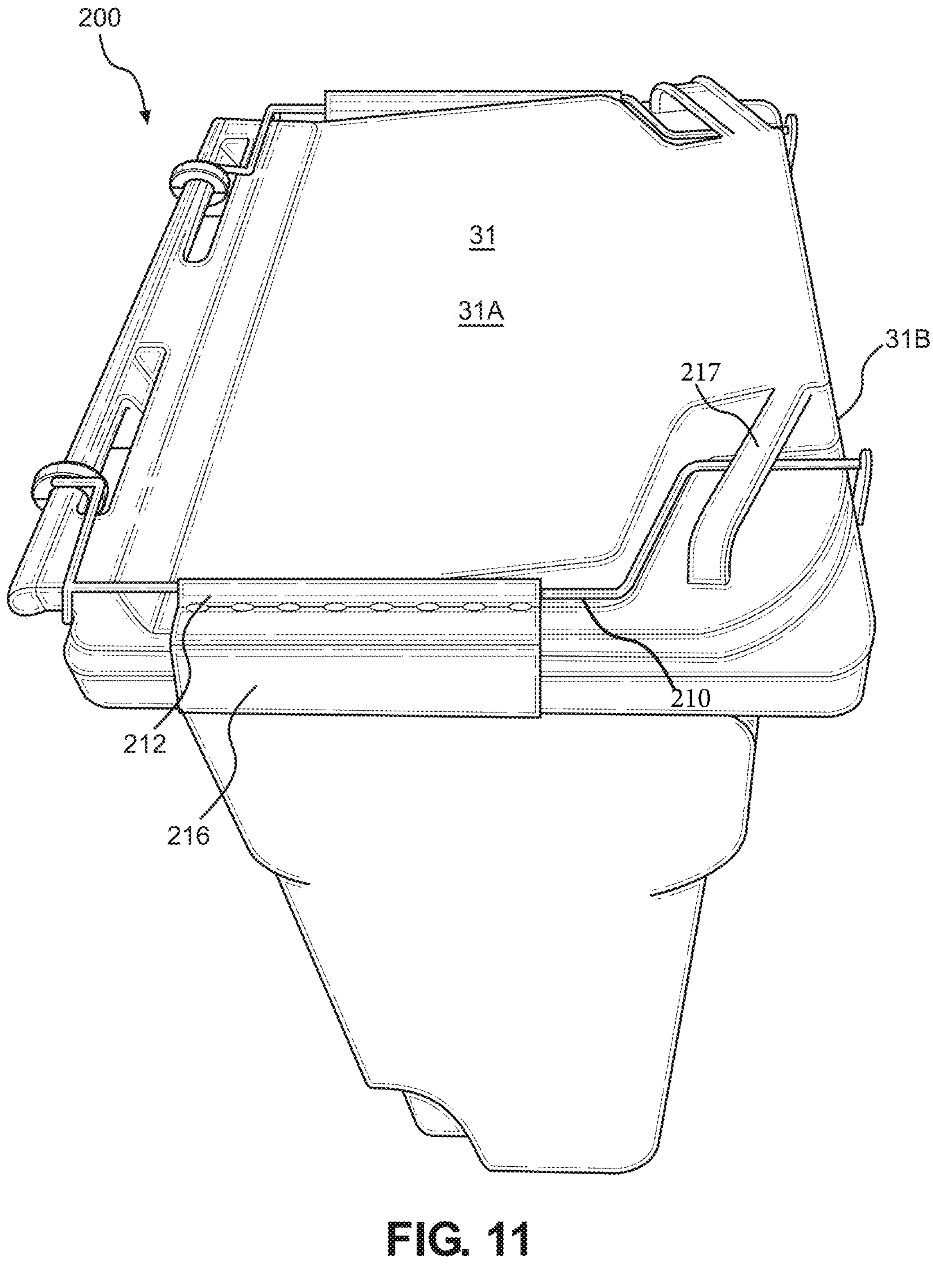
FIG. 11 shows a side environmental perspective view of a front hanger of a third embodiment of the automatic trash can lid stabilizer.

FIG. 11 shows an overhead environmental perspective view of a security bar 210 of a third embodiment of the automatic trash can lid stabilizer 200.

The security bar 210 may include an elongated bar 212.

The elongated bar 212 may be adapted to extend horizontally straight across while making direct contact with the trash can lid (FIG. 3, 31). The elongated bar 212 may fit around a raised surface 31A of the trash can lid 31 that may extend downward from each outer edge 31B of the trash can lid 31.

The elongated bar 212 may be attached to the security bar 210 and extends horizontally straight across most of the trash can lid 31. The elongated bar 212 may go underneath a handle 217 disposed on trash can lid 31.

Figure 12:
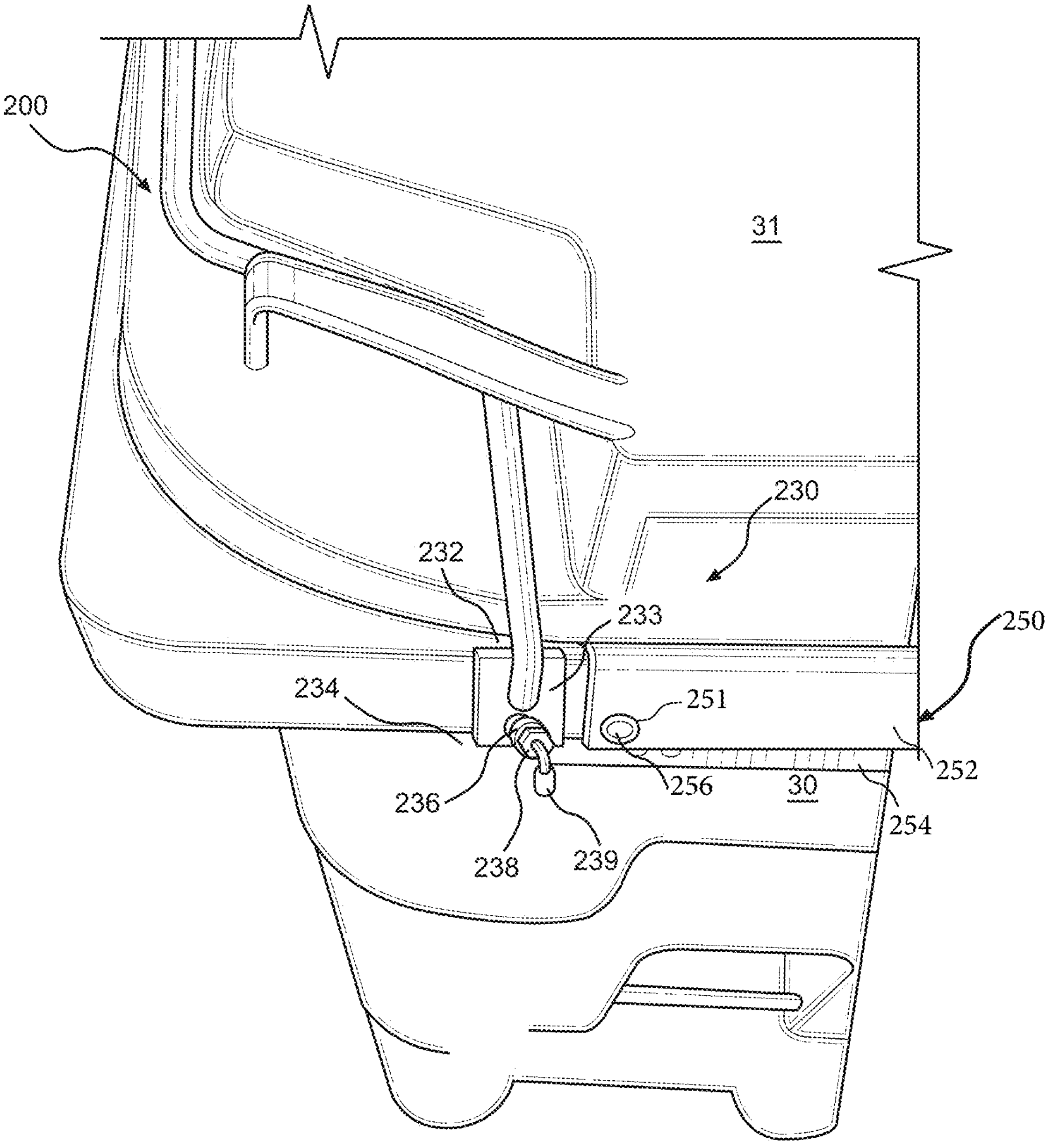
FIG. 12 shows an overhead environmental perspective view of a side hanger of the third embodiment of the automatic trash can lid stabilizer.

FIG. 12 shows a side environmental perspective view of a locking system 230 and a security overhang 250 of the security bar 210 of the third embodiment of the automatic trash can lid stabilizer 200.

The locking system 230 may include an elongated plate 252, a lid grasping device 234, and a securing fastener 236.

The elongated plate 232 may extend downward from the elongated bar 212 along and past the outer edge of the trash can lid 31. The elongated plate 232 may also include an elongated slot 233 extending further downward from a relatively lower side of the elongated plate 232. The lid grasping device 234 may be disposed underneath the trash can lid 31 and may be coupled to the elongated plate 232. The securing fastener 236 may include an animal latch 238 that may be activated by a key 235 inserted into a key inlet 237 disposed on the lid grasping device 234.

The security overhang 250 may include an outer downward covering 252, a horizontal elongated base 254, and a pair of fasteners 256. The security overhang 250 may be disposed on the front edge of the lid 31.

The outer downward covering 252 may include a pair of apertures 251 disposed on each end of the outer downward covering 252 and provide additional support and protection to the edge of the trash can lid 31. The outer downward covering 252 may be made of aluminum, metal, or the like. The horizontal elongated base 254 may be disposed underneath the outer downward covering 252 between the elongated plates 232 attached to the trash can 30. The pair of fasteners 256 may be inserted through the pair of apertures 251 to secure the outer downward covering 252 and the horizontal elongated base 254.

Figure 13:
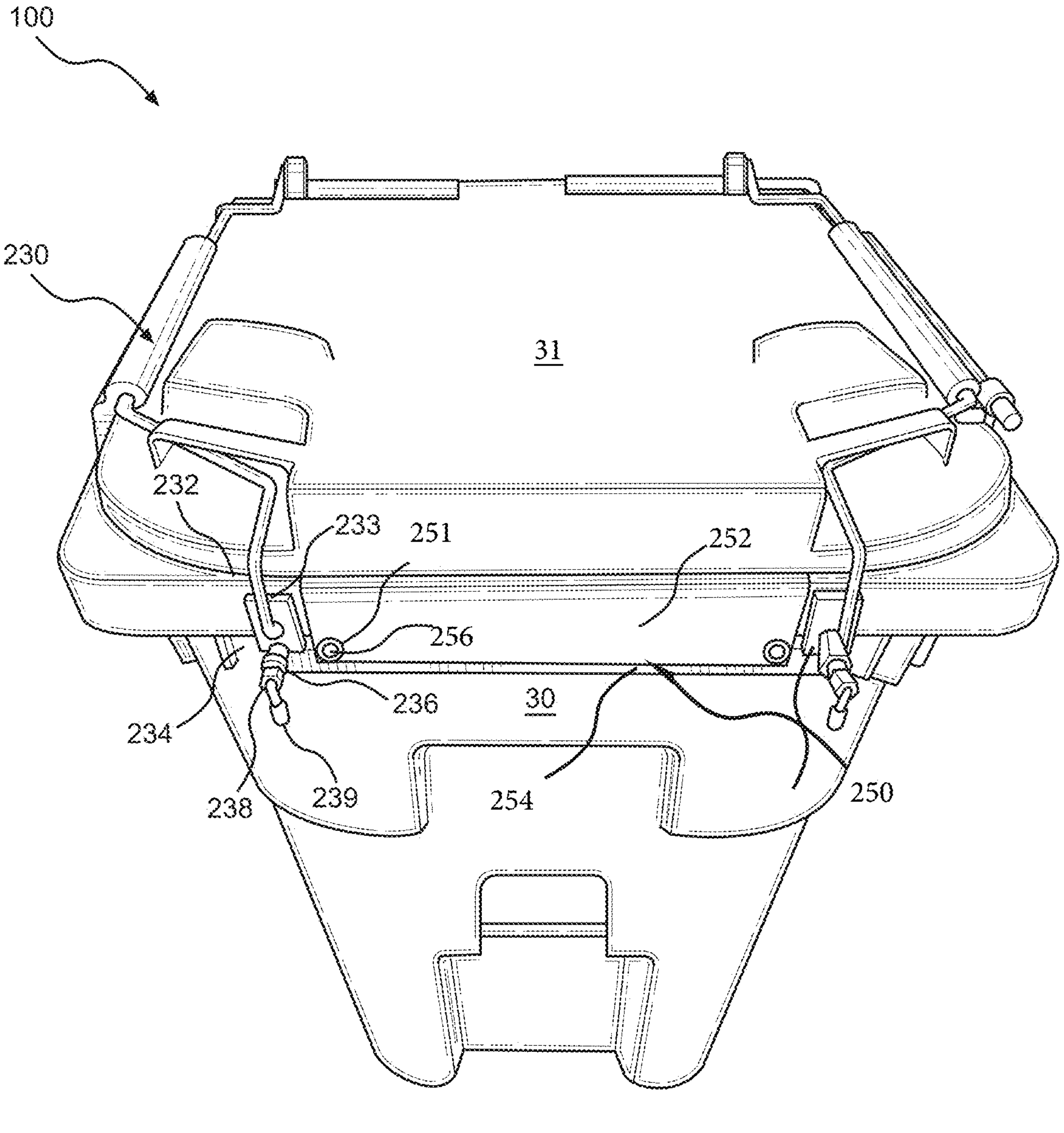
FIG. 13 shows a rear perspective view of the fourth embodiment of the automatic trash can lid stabilizer secured to a trash can.

FIG. 13 shows a front perspective view of the fourth embodiment of the automatic trash can lid stabilizer 100 secured to a trash can 30.

The trash can lid stabilizer 100 may include the locking system 230 that may include an elongated plate 232, a lid grasping device 234, and a securing fastener 236.

The securing fastener 236 may include an animal latch 238 that may be activated by the animal latch 238 disposed on the lid grasping device 234 to prevent an animal such as a bear or the like from breaking into the trash can 30. The animal latch 238 may be rotated approximately a quarter turn or the like and locks in place, securing the trash can lid 31 to the trash can 30. The animal latch 238 may be angled at approximately 90 degrees and have a protective covering 239 disposed on a distal end of the animal latch 238 for protection against contact injuries.

The pair of fasteners 256 may be inserted through the pair of apertures 251 disposed on each end of the outer downward covering 252.

Figure 14:
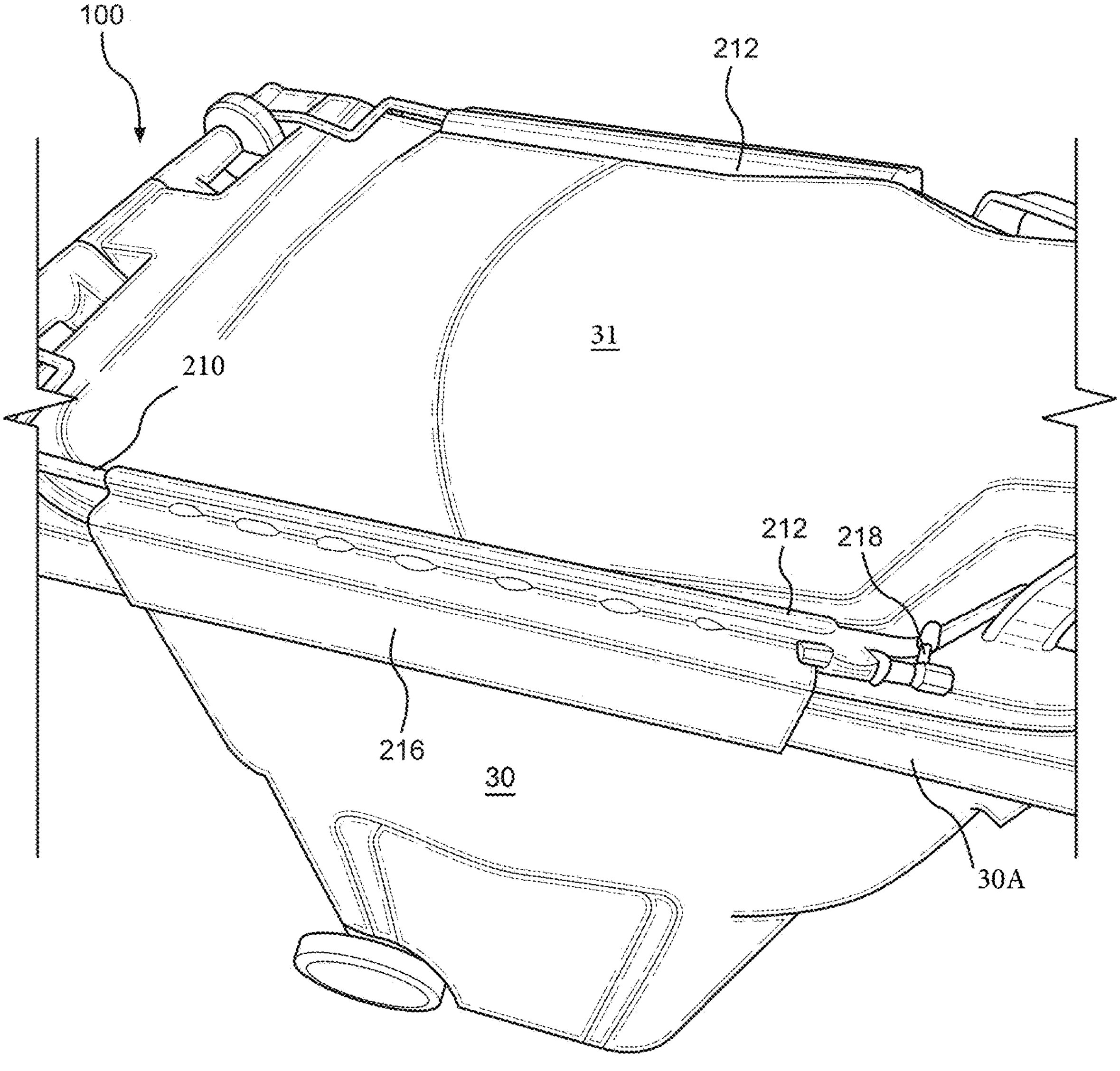
FIG. 14 shows a first side perspective view of the fourth embodiment of the automatic trash can lid stabilizer secured to a trash can.

FIG. 14 shows a first side perspective view of the fourth embodiment of the automatic trash can lid stabilizer 100 secured to a trash can 30.

The trash can lid stabilizer 100 may include the security bar 210 that may include an elongated bar 212.

The elongated bar 212 may include a first rotating flap 216 that may extend around the exterior of the trash can sidewall 30A. The first rotating flap 216 may be secured to the exterior of the trash can sidewall 30A with an additional animal latch 218 that may be rotated approximately a quarter turn or the like and locks in place, securing the trash can lid 31 to the exterior of the trash can sidewall 30A. The first rotating flap 216 may be welded to the elongated bar 212.

Figure 15:
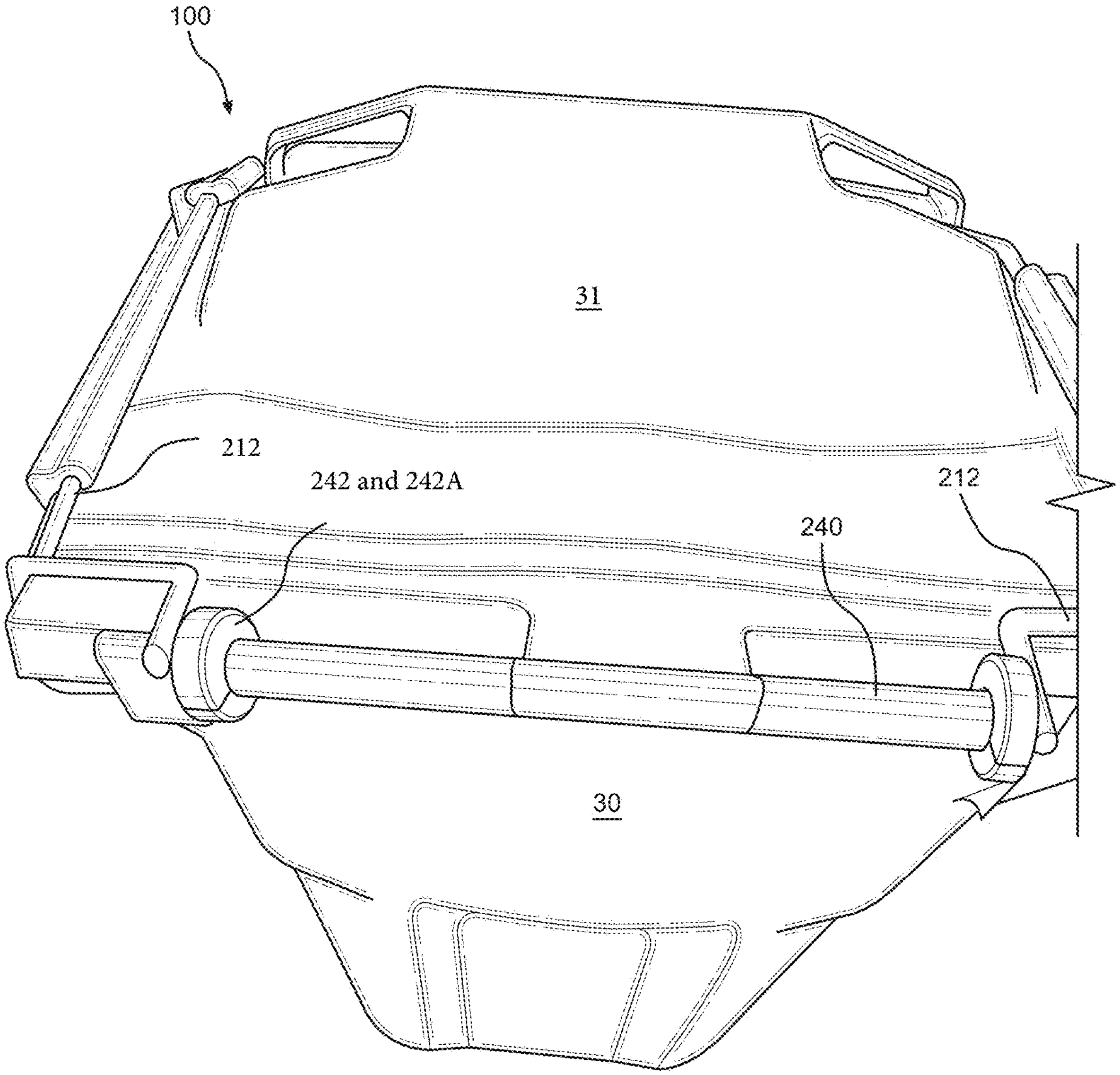
FIG. 15 shows a front perspective view of the fourth embodiment of the automatic trash can lid stabilizer secured to a trash can.

FIG. 15 shows a front perspective view of the fourth embodiment of the automatic trash can lid stabilizer 100 secured to a trash can 30.

The trash can lid stabilizer 100 may include a back support bar 240 that extends across the back of the trash can 30.

The back support bar 240 may include a pair of collars 242 and a rotating encasement 244.

The pair of collars 242 may each be a half-circle split collar that includes a hinge 242A that swivels around and rotates with the trash can lid 31 that is disposed directly around the back support bar 240. The rotating encasement 244 may extend from the trash can lid 31 and encircle around the back support bar 240 and rotates with the trash can lid 31.

The back support bar 240 may rotatably receive the trash can lid 31 and the elongated bar 212 and serve as a hinge pin for the trash can lid 31 and the elongated bar 212 to rotate around.

Figure 16:
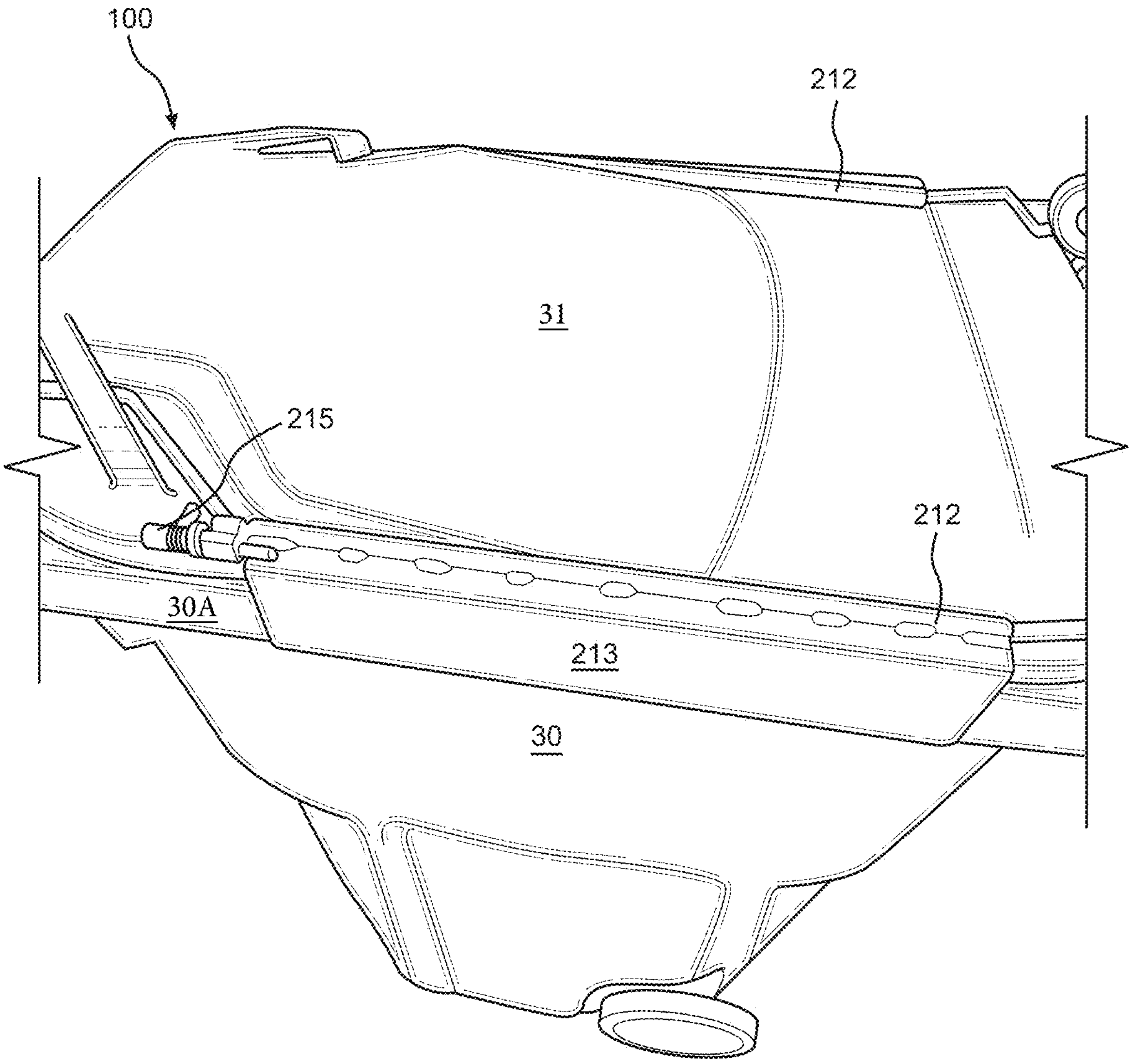
FIG. 16 shows a second side perspective view of the fourth embodiment of the automatic trash can lid stabilizer secured to a trash can.

FIG. 16 shows a second side perspective view of the fourth embodiment of the automatic trash can lid stabilizer 100 secured to a trash can 30.

The elongated bar 212 may include a second rotating flap 213 that may extend around the exterior of the trash can sidewall 30A. The second rotating flap 213 may be secured to the exterior of the trash can sidewall 30A with an additional animal latch 215 may be rotated approximately a quarter turn or the like and locks in place, securing the trash can lid 31 to the exterior of the trash can sidewall 30A. The second rotating flap 213 may be welded to the elongated bar 212.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An automatic trash can lid stabilizer, comprising:

a security bar having an elongated bar on either side of a trash can lid;

wherein the elongated bar is adapted to extend along either side of the trash can lid while making direct contact with the trash can lid;

a locking system having an elongated plate, a lid grasping device, and a securing fastener;

wherein the elongated plate extends downward from each end of the elongated bars along and past an outer edge of the trash can lid;

a back support bar having a pair of collars and a rotating encasement, the back support bar extending across behind the trash can lid;

wherein the elongated bar includes a first rotating flap that extends around an exterior of a trash can sidewall;

wherein the first rotating flap is secured to the exterior of the trash can sidewall with an animal latch, securing the trash can lid to the exterior of the trash can sidewall;

wherein a second rotating flap is secured to the exterior of the trash can sidewall with an additional animal latch, securing the trash can lid to the exterior of the trash can sidewall;

wherein the back support bar rotatably receives the trash can lid and the elongated bar serves as a hinge pin for the trash can lid and the elongated bar to rotate around;

wherein the animal latch is rotated a quarter turn and locks in place, securing the trash can lid to the trash can.

2. The automatic trash can lid stabilizer, according to claim 1, wherein the elongated bar includes the second rotating flap that extends around the exterior of a trash can sidewall.

3. The automatic trash can lid stabilizer, according to claim 2, wherein the second rotating flap is welded to the elongated bar.

4. The automatic trash can lid stabilizer, according to claim 1, wherein the lid grasping device is disposed underneath the trash can lid and is coupled to the elongated plate.

5. The automatic trash can lid stabilizer, according to claim 1, wherein the securing fastener includes the animal latch.

6. The automatic trash can lid stabilizer, according to claim 5, wherein the animal latch is angled at 90 degrees and has a protective covering disposed on a distal end of the animal latch for protection against contact injuries.

7. The automatic trash can lid stabilizer, according to claim 5, wherein the animal latches have a protective covering disposed on a distal end of the animal latch for protection against contact injuries.

8. The automatic trash can lid stabilizer, according to claim 1, wherein the locking system is disposed on each end of the elongated bar at the edge of the trash can lid.

9. The automatic trash can lid stabilizer, according to claim 1, wherein the pair of collars are each a half-circle split collar that includes a hinge that swivels around and rotates with the trash can lid that is disposed directly around the back support bar.

10. The automatic trash can lid stabilizer, according to claim 1, wherein the rotating encasement extends from the trash can lid and encircles around the back support bar and rotates with the trash can lid.

11. The automatic trash can lid stabilizer, according to claim 1, further comprising a security overhang that include an outer downward covering, a horizontal elongated base, and a pair of fasteners.

12. The trash can and automatic lid stabilizer system, according to claim 11, wherein the elongated plate includes an elongated slot extending further downward from the elongated plate.

13. The automatic trash can lid stabilizer, according to claim 11, wherein the securing fastener includes the animal latch.

14. The automatic trash can lid stabilizer, according to claim 13, wherein the animal latch is rotated a quarter turn and locks in place, securing the trash can lid to the trash can.

15. The automatic trash can lid stabilizer, according to claim 13, wherein the animal latch is angled at 90 degrees and has a protective covering disposed on a distal end of the animal latch for protection against contact injuries.

16. A trash can and automatic lid stabilizer system, comprising:

a trash can having a bottom, a perimeter sidewall, an open upper end, and a lid pivotally attached to the perimeter sidewall;

an automatic lid stabilizer having a security bar having an elongated bar along either side of a trash can lid;

wherein the elongated bar is adapted to extend along either side of the a trash can lid while making direct contact with the trash can lid;

a locking system having an elongated plate, a lid grasping device, and a securing fastener;

wherein the elongated plate extends downward from each end of the elongated bar along and past an outer edge of the trash can lid;

a back support bar having a pair of collars and a rotating encasement, the back support bar extending across behind the trash can lid;

wherein the elongated bar includes a first rotating flap that extends around an exterior of the trash can sidewall.

17. The automatic trash can lid stabilizer, according to claim 16, wherein the first rotating flap is secured to the exterior of the trash can sidewall with an animal latch that is rotated a quarter turn and locks in place, securing the trash can lid to the exterior of the trash can sidewall.

18. The automatic trash can lid stabilizer, according to claim 16, wherein the elongated bar includes a second rotating flap that extends around the exterior of a trash can sidewall.

19. The automatic trash can lid stabilizer, according to claim 18, wherein the second rotating flap is secured to the exterior of the trash can sidewall with an additional animal latch that is rotated a quarter turn and locks in place, securing the trash can lid to the exterior of the trash can sidewall.

20. The automatic trash can lid stabilizer, according to claim 18, wherein the second rotating flap is welded to the elongated bar.

21. The automatic trash can lid stabilizer, according to claim 16, wherein the back support bar rotatably receives the trash can lid and the first elongated bar and the elongated bar and serves as a hinge pin for the trash can lid and the elongated bar to rotate around.

22. The automatic trash can lid stabilizer, according to claim 16, wherein the animal latches have a protective covering disposed on a distal end of the animal latch for protection against contact injuries.

23. The automatic trash can lid stabilizer, according to claim 16, further comprising a security overhang that include an outer downward covering, a horizontal elongated base, and a pair of fasteners.

* * * * *